United States Patent [19]

Sekiguchi

[11] Patent Number: 4,998,462
[45] Date of Patent: Mar. 12, 1991

[54] BEVERAGE EXTRACTING APPARATUS FOR VENDING MACHINES

[75] Inventor: Ryoichi Sekiguchi, Isesaki, Japan
[73] Assignee: Sanden Corporation, Gunma, Japan
[21] Appl. No.: 542,039
[22] Filed: Jun. 22, 1990

Related U.S. Application Data

[63] Continuation-in-part of Ser. No. 441,476, Nov. 27, 1989, abandoned.

[30] Foreign Application Priority Data

Nov. 28, 1988 [JP] Japan .................................. 63-154399
Jun. 23, 1989 [JP] Japan .................................. 1-161901

[51] Int. Cl.$^5$ .................................................. A47J 31/32
[52] U.S. Cl. .................................. 99/289 T; 99/302 R
[58] Field of Search ................ 99/289 R, 289 T, 292, 99/279, 295, 299, 300, 302 R, 275; 426/433, 432

[56] References Cited

U.S. PATENT DOCUMENTS

| | | | |
|---|---|---|---|
| 3,292,526 | 12/1966 | Heier | 99/289 R |
| 3,349,690 | 10/1967 | Heier | 99/289 R |
| 3,496,861 | 2/1970 | Stahler | 99/289 R |
| 4,271,753 | 6/1981 | Neely | 99/289 R |
| 4,389,924 | 6/1983 | Hoesselbarth | 99/289 R |
| 4,506,596 | 3/1985 | Shigenoby | 99/289 T |
| 4,648,313 | 3/1987 | Kokubun et al. | 99/289 R |
| 4,667,585 | 5/1987 | Harashima et al. | 99/289 R |
| 4,667,586 | 5/1987 | Harada et al. | 99/289 R |
| 4,669,372 | 6/1987 | Harada | 99/289 R |
| 4,715,270 | 12/1987 | Harada | 99/289 R |

Primary Examiner—Timothy F. Simone
Attorney, Agent, or Firm—Banner, Birch, McKie & Beckett

[57] ABSTRACT

A beverage extracting apparatus for vending machines includes a cylinder for storing a liquid mixture of water and raw material of a beverage, a valve opening and closing the inflow port of the cylinder, a filter covering the bottom opening of the cylinder, a filter support vertically moved to open and close the bottom opening of the cylinder via the filter, an air pressure supply for supplying pressurized air into the cylinder to forcibly filtrate the liquid mixture stored in the cylinder via the filter, a filter support guide frame vertically guiding the filter support, a filter support drive for vertically moving the filter support and including a lever pivotably supported by the filter support guide frame and engaged with the filter support, and an adjusting device for adjusting the vertical position of the filter support guide frame. The pressing force of the filter support onto the bottom of the cylinder can be easily adjusted to an adequate force by adjusting the vertical position of the filter support guide frame by the adjusting device. High accuracy of the parts for the filter support driving mechanism is not particularly required, thereby making the processing of the parts for the mechanism easy and reducing the cost for manufacturing the apparatus.

26 Claims, 11 Drawing Sheets

F I G. 3
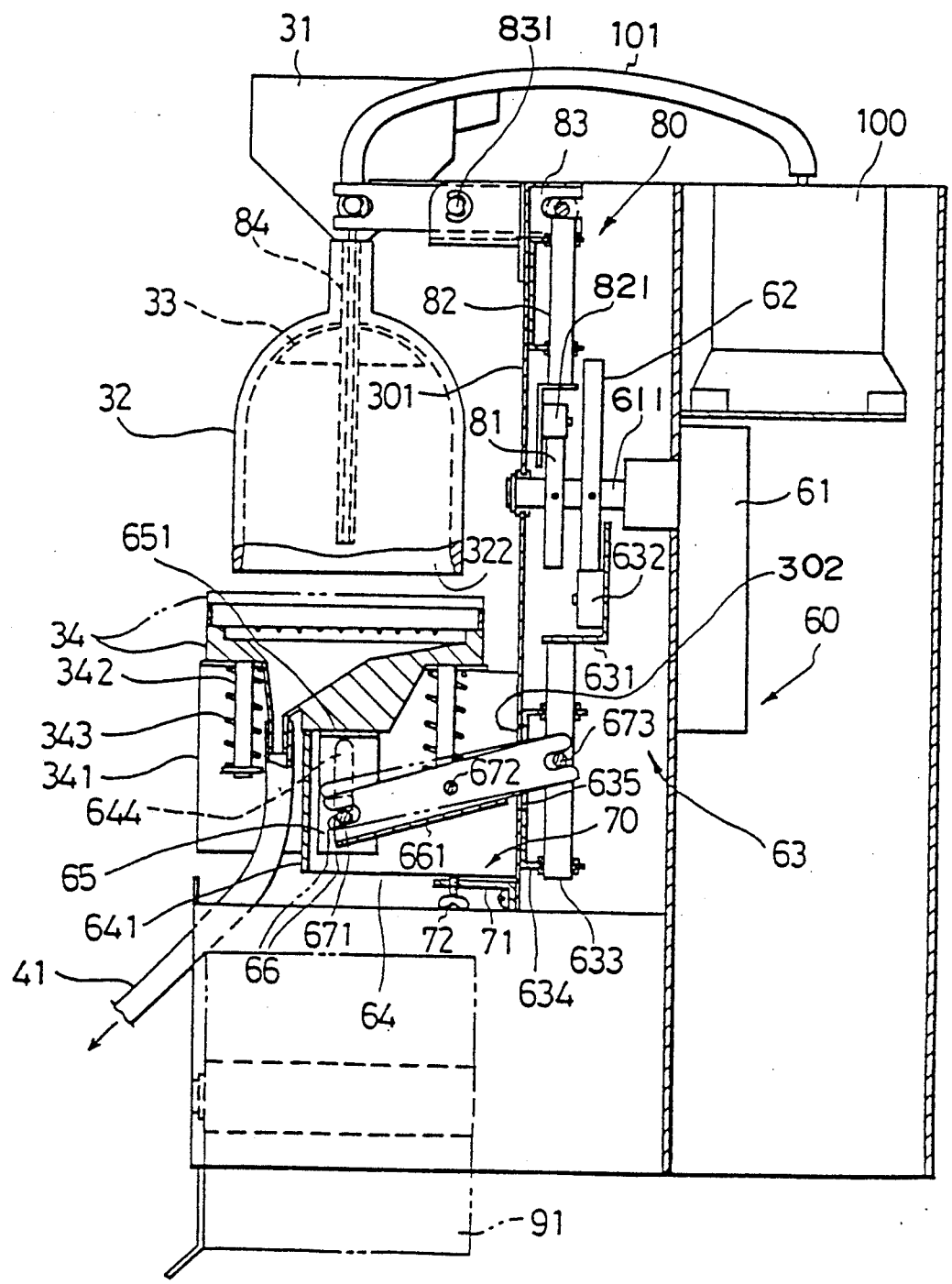

BEVERAGE EXTRACTING APPARATUS FOR VENDING MACHINES

This application is a continuation-in-part of copending application Ser. No. 441,476, filed on Nov. 27, 1989. Now abandoned.

BACKGROUND OF THE INVENTION

1. Field of the Invention

The present invention relates to a beverage extracting apparatus for vending machines which mixes water and raw material of a beverage, filtrates the liquid mixture via a filter and extracts the filtrated liquid mixture.

2. Description of the Prior Art

A conventional beverage extracting apparatus for vending machines is shown in FIGS. 11 and 12 (Japanese Patent Publication SHO 62-211800). A liquid mixture of water, for example hot water, and the raw material of a beverage, for example a powder, is introduced into a cylinder 1 through an inflow port 1a. When a valve 2 opens the inflow port 1a, a bottom opening 1b is closed by a filter 4 moved vertically together by filter support 5 which is urged downwardly by a return spring 5a which also provides for the opening and closing of bottom opening 1b. After the liquid mixture is stored in cylinder 1, valve 2 is closed and pressurized air is supplied into the cylinder from a pressurized air generating means 3. The liquid mixture stored in cylinder 1 is forcibly filtrated and extracted by the pressure of the supplied pressurized air via filter 4.

The filter support drive mechanism 6 is constructed, for example, as shown in FIG. 12. Cam 6b is driven (rotated) by a motor 6a, driving force transmitting mechanism 6c is moved vertically by rotated cam 6b, and a lever 6e pivotably supported at a position 6f is rotated between the positions illustrated by the continuous line and the dashed line in FIG. 12 by engaging the bottom portion of driving force transmitting mechanism 6c with one end portion of lever 6e. The other end portion of lever 6e engages a lifting frame 6d attached to filter support 5. When lever 6e is rotated clockwise from the position shown by the continuous line to the position shown by the dashed line, filter support 5 is moved up together with lifting frame 6d and bottom opening 1b of cylinder 1 is closed by filter support 5 and filter 4 as shown in FIG. 11.

In such a conventional apparatus a very high accuracy is required for closing of the bottom opening 1b. Namely, if filter support 5 is moved up too far and the filter support is pressed too hard to the bottom of cylinder 1, an excessive load is applied to motor 6a. On the other hand, if filter support 5 is moved up too little and the force of the filter support on the bottom of cylinder 1 is too small, the liquid mixture in the cylinder to be filtrated leaks from bottom opening 1b to the outside when the pressurized air is supplied into the cylinder. Accordingly, the periphery shape of cam 6b, the length of driving force transmitting mechanism 6c and the length of lever 6e must be designed and processed with precision to achieve the proper movement and pressing force of filter support 5.

However, precision processing of the parts of the filter support drive mechanism increases the cost of manufacturing the apparatus. Moreover, since the installation error of the parts more or less occurs in the assembly of the apparatus even if the parts are processed with high accuracy, it is difficult to precisely set the movement amount and pressing force of filter support 5 to a target amount and a target force.

SUMMARY OF THE INVENTION

Accordingly, an object of the present invention is to provide a beverage extracting apparatus for vending machines which allows for easy adjustment of the pressing force of the filter support onto the bottom of the cylinder eliminating the need for precision parts for driving the filter support, thereby making it easy to design and process the parts and reducing the cost for manufacturing the apparatus.

Directed to achieving this and other objects, the present invention provides beverage extracting apparatuses for vending machines.

A first embodiment of the beverage extracting apparatus according to the present invention comprises:

a cylinder having an inflow port on its upper portion and an opening on its bottom portion, into which a liquid mixture of water and a raw material of a beverage is introduced through the inflow port;

valve means for opening and closing the inflow port of the cylinder;

filter means for covering the bottom opening of the cylinder;

filter support means for supporting the filter means from the lower side of the filter means, the filter support means opening and closing the bottom opening of the cylinder by vertically moving the filter means;

pressurization means for supplying pressurized air into the cylinder through an air path when the inflow port is closed by the valve means and the bottom opening is closed by the filter means to forcibly filtrate the liquid mixture stored in the cylinder through the filter means;

a filter support guide frame to vertically guide the filter support means, the filter support guide frame being adjustable in its vertical position;

filter support drive means for vertically moving the filter support means, the filter support drive means including a power source, a driving force transmitting mechanism and a lever, the driving force transmitting mechanism being moved vertically by the power source through the lever to vertically move the filter support means, the lever having a longitudinally central portion which is vertically pivotably supported by the filter support guide frame, the one end portion of the lever engaging the driving force transmitting mechanism and the other end portion of the lever engaging the filter support means; and adjusting means engaging the filter support guide frame for adjusting the vertical position of the filter support guide frame.

A second embodiment of the beverage extracting apparatus for vending machines according to the present invention comprises packing means which is interposed between the filter support means and the filter means and has a property of resiliency, and the adjusting means has spring means for urging the filter support guide frame upwardly.

In the first and second embodiments of the beverage extracting apparatuses of the present invention, when the bottom opening of the cylinder is to be closed by the filter means, a power source is driven, a driving force transmitting mechanism is moved downwardly, and a lever is rotated around a fulcrum attached to the filter support guide frame via the engagement of the one end portion of the lever with the driving force transmitting mechanism. The filter support means engaging the other end portion of the lever is moved up in association with the rotation of the lever, and the filter support means closes the bottom opening of the cylinder via the filter means.

If the pressing force of the filter support means onto the bottom of the cylinder is determined to be too high, the filter support guide frame is adjusted in its vertical position by adjusting the adjusting means to move the frame down an adequate distance. The fulcrum of the lever is moved down by the adjusted distance of the filter support guide frame, and the lever is rotated around the one end portion thereof engaged with the driving force transmitting mechanism. The filter support means is moved down by this rotation of the lever due to the adjustment, and the pressing force between the bottom of the cylinder and the filter means is decreased and set to an adequate force. Particularly in the second embodiment, if the pressing force of the filter support means onto the bottom of the cylinder is too high, the packing means is greatly compressed. In such an instance, the filter support guide frame is free to move vertically. The resilient force of the compressed packing means moves the filter support guide frame and the filter support means and the lever engaging the filter support means downward by its resilient force against the upward urging force by the spring means of the adjusting means. As a result, the resilient force of the packing means and the urging force of the spring means are substantially balanced, and the pressing force between the bottom of the cylinder and the filter means is decreased and automatically set to an adequate force.

On the other hand, if the pressing force of the filter support means onto the bottom of the cylinder is determined to be too weak, the filter support guide frame is adjusted in its vertical position by adjusting the adjusting means to move the frame up an adequate distance. The lever is rotated around the one end portion thereof in the direction opposite to the above direction, and the filter support means is moved up by the rotation of the lever due to the adjustment. Therefore, the pressing force of the filter support means onto the bottom of the cylinder is increased and set to an adequate force. Particularly in the second embodiment, the filter support guide frame is moved up by the urging force of the spring means of the adjusting means against the weak resilient force of the packing means, and the pressing force between the bottom of the cylinder and the filter means is automatically controlled to an adequate force.

The pressing force of the filter support means can be easily adjusted to a target force even if the parts for driving the filter support means are not manufactured with precision, thereby making the design, processing and assembly of the parts for the apparatus easy and reducing the cost of manufacturing the apparatus.

BRIEF DESCRIPTION OF THE DRAWINGS

A preferred exemplary embodiment of the present invention will now be described with reference to the accompanying drawings which are given by way of example only. The invention is only limited by the claims appended hereto.

FIG. 3 is a vertical sectional view of the beverage extracting apparatus shown in FIG. 2.

DETAILED DESCRIPTION OF THE PREFERRED EMBODIMENTS OF THE PRESENT INVENTION

Figure 1:
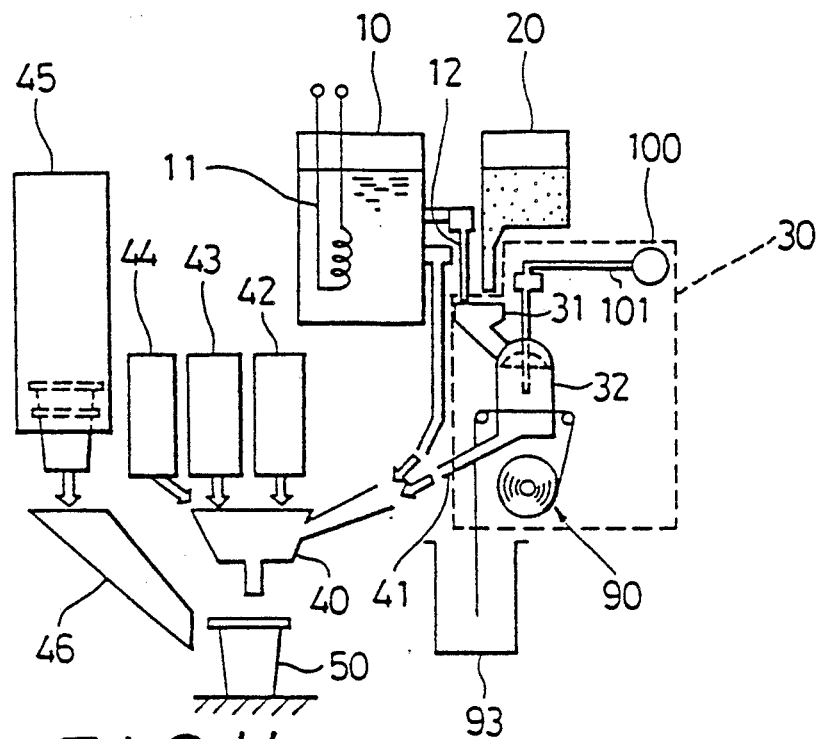
FIG. 1 is a schematic view of a vending machine including a beverage extracting apparatus according to a first embodiment of the present invention.
Figure 11:
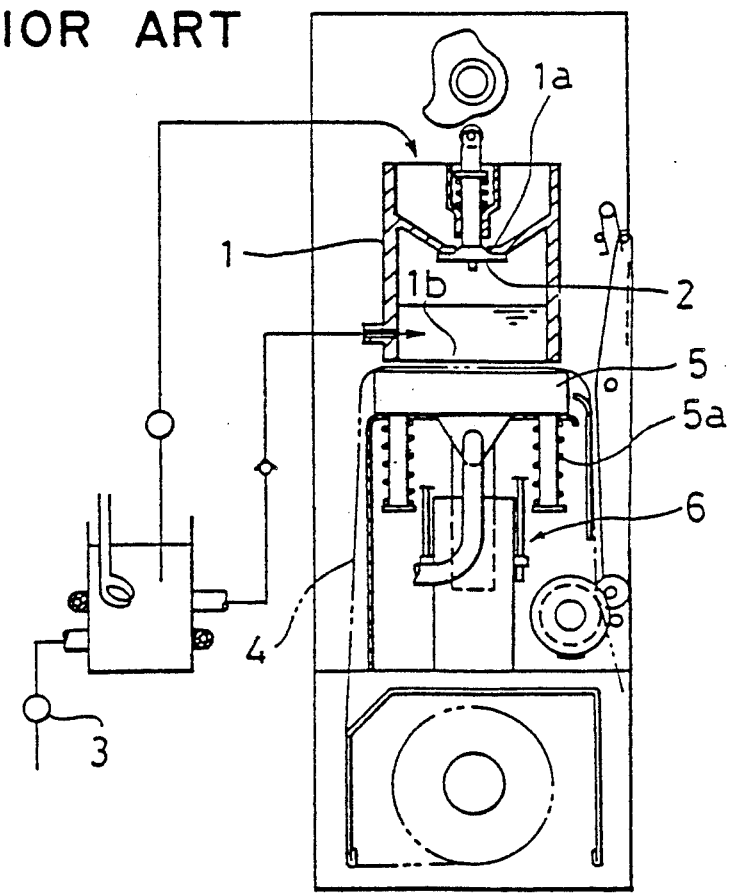
FIG. 11 is an elevational view of the prior art beverage extracting apparatus.

Referring to the drawings, FIGS. 1 to 5 illustrate a beverage extracting apparatus for vending machines according to a first embodiment of the present invention. FIG. 1 shows a schematic structure of a vending machine selling a beverage, for example, coffee. A hot water storage tank 10 stores hot water heated by a heater 11. A raw material bin 20 stores the raw material of the beverage, for example, coffee powder. A beverage extracting apparatus 30 mixes and stirs the hot water supplied from hot water storage tank 10 through a hot water supply pipe 12 and the raw powder supplied from raw material bin 20, and extracts a liquid for the beverage (for example, coffee) from the liquid mixture of the hot water and the raw powder. The extracted liquid is sent to a mixing bin 40 through an extracted liquid delivering pipe 41, and in this embodiment, after the sugar from a sugar bin 42 and the cream from a cream bin 43 are added to the liquid in the mixing bin, the liquid is poured into a cup 50 as a beverage to be sold. Cup 50 is sent from a cup storing and delivering device 45 through a cup chute 46. In this embodiment, a coffee bin 44 for storing a instant coffee is also provided in the vending machine.

Figure 2:
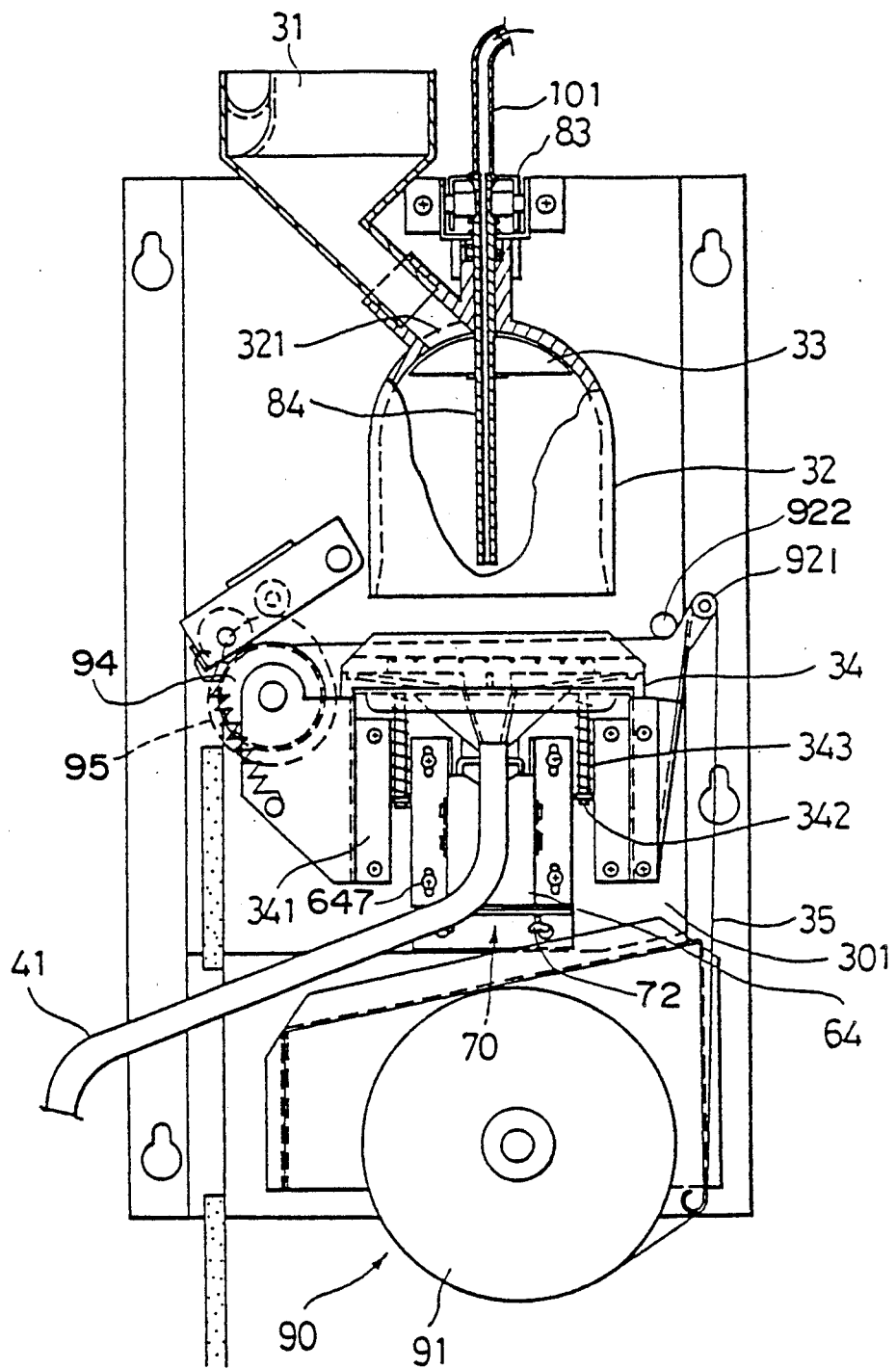
FIG. 2 is an enlarged elevational view of the beverage extracting apparatus shown in FIG. 1.

FIGS. 2 and 3 show beverage extracting apparatus 30.

A mixing hopper 31 mixes the hot water introduced from hot water storage tank 10 and the raw powder deposited from raw material bin 20 and forms the liquid mixture of the hot water and the powder. The liquid mixture is then introduced into a cylinder 32. Cylinder 32 has an inflow port 321 opened and closed by a valve 33 on the upper portion thereof and an opening 322 on the bottom portion thereof.

Bottom opening 322 is covered by a filter 35 and is opened and closed by the vertical motion of a filter support 34 disposed below the bottom opening. Filter support 34 is disposed on a support frame 341. Rods 342 for supporting springs 343 downwardly extend from the lower surface of filter support 34 through support frame 341. Filter support 34 is urged downward by springs 343 via rods 342. Filter support 34 is connected to extracted liquid delivering pipe 41, and the liquid mixture filtrated by filter 35 is extracted through the filter support and the extracted liquid delivering pipe into mixing bin 40 as shown in FIG. 1.

Referring now to FIG. 3, filter support 34 is vertically moved by a filter support drive means 60. In this embodiment, filter support drive means 60 includes a motor 61, a cam 62 attached to an output shaft 611 of the motor, and a driving force transmitting mechanism 63 engaging the cam for changing the rotational motion of the cam to the vertical linear motion of the driving force transmitting mechanism.

This driving force transmitting mechanism 63 has an L-shaped member 631 and a rotational roller 632 supported on the vertical plate portion of the L-shaped member. The periphery of cam 62 contacts the periphery of roller 632, and L-shaped member 631 is vertically moved by the rotation of the cam via the contact between the cam and the roller. A rod 633 is connected to the horizontal plate portion of L-shaped member 631, and the rod vertically extends through a guide plate 634. This rod 633 vertically moves integrally with L-shaped member 631.

Figure 4:
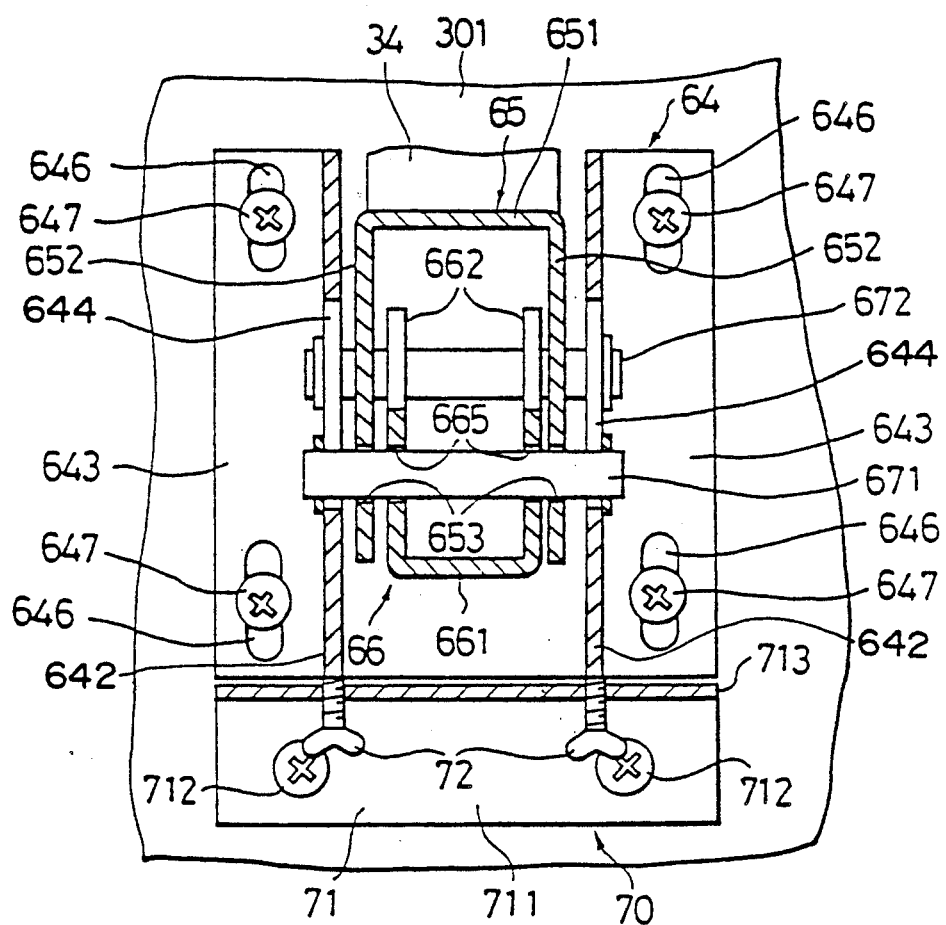
FIG. 4 is an enlarged vertical sectional view of a part of the beverage extracting apparatus shown in FIG. 3.
Figure 5:
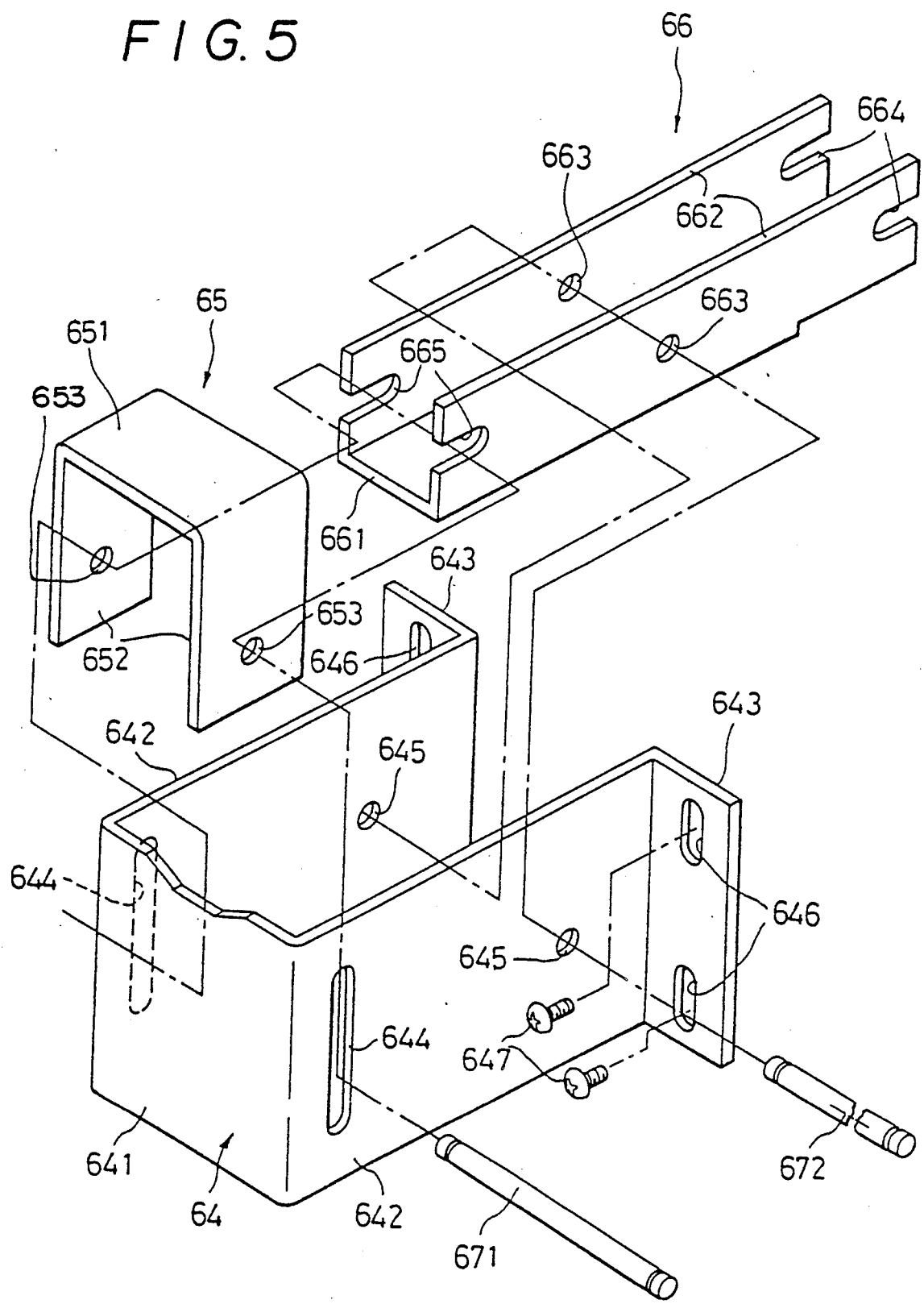
FIG. 5 is an exploded perspective view of the part shown in FIG. 4.

Filter support drive means 60 also has a lever 66 for transmitting the driving force from driving force transmitting mechanism 63 to a lifting frame 65 fixed to the bottom portion of filter support 34. Lever 66 is vertically pivotably supported via a pin 672 at its longitudinally central portion by a filter support guide frame 64 disposed below filter support 34. As shown in FIGS. 4 and 5, filter support guide frame 64 comprises a front plate portion 641, side plate portions 642 spaced from each other and extending backwardly from the front plate portion, and attachment plate portions 643 extending perpendicular to the respective side plate portions. Vertically extending slots 644 are defined on the front portions of respective side plate portions 642, and circular holes 645 are defined on the relatively rear portions of the respective side plate portions. Vertically extending slots 646 are defined on the upper and lower portions of each attachment plate portion 643. Filter support guide frame 64 is fixed to a partition 301 for parting the front side of beverage extracting apparatus 30 from the rear side thereof by fastening screws 647 extending through slots 646, and the filter support guide frame can be adjustable in its vertical position by loosening the screws.

Lifting frame 65 is positioned inside of filter support guide frame 64. Lifting frame 65 comprises an upper plate portion 651 and side plate portions 652 spaced from each other and downwardly extending from the upper plate portion. A circular hole 653 is defined on each side plate portion 652 of lifting frame 65. A pin 671 extending between and through slots 644 of filter support guide frame 64 and slidably engaging the inner surfaces of the slots is inserted through circular holes 653 of lifting frame 65, and the lifting frame is vertically slidably supported by the filter support guide frame via the pin. Filter support 34 is attached onto upper plate portion 651 of lifting frame 65, and the filter support is vertically moved by moving pin 671 vertically along slots 644.

Lever 66 comprises a bottom plate portion 661 and side plate portions 662 spaced from each other and upwardly extending from the bottom plate portion. A circular hole 663 is defined in each side plate portion 662 of lever 66 at a longitudinally central position thereof. Pin 672 extending between and through holes 645 of filter support guide frame 64 is inserted through circular holes 663 of lever 66. Lever 66 can be vertically pivotably supported by filter support guide frame 64 via pin 672. U-shaped slots 664 are defined on the one end portions of lever 66 and U-shaped slots 665 are defined on the other end portions of the lever. A pin 673 (FIG. 3) connected to driving force transmitting mechanism 63 is inserted into and through U-shaped slots 664 of lever 66 slidably along the slots, and the one end portion of the lever engages the driving force transmitting mechanism via the pin. Pin 671 connected to lifting frame 65 is inserted into and through U-shaped slots 665 of lever 66 slidably along the slots, and the other end portion of the lever engages the lifting frame via the pin. Lever 66 is supported pivotably around the fulcrum of pin 672. The one end portion of lever 66 having U-shaped slots 664 extends through a hole 302 (FIG. 3) defined on partition 301 and a hole 635 (FIG. 3) defined on guide plate 634 (FIG. 3) to reach the position of pin 673 connected to driving force transmitting mechanism 63.

FIG. 4 further shows an adjusting means 70 for adjusting the vertical position of filter support guide frame 64 provided below the filter support guide frame. In this embodiment, adjusting means 70 comprises an L-shaped supporting plate 71 whose vertical plate portion 711 is fixed to partition 301 by screws 712 and adjusting screws 72 (for example, thumbscrews) screwed and extending upwardly through an upper plate portion 713 of the supporting plate. The top surfaces of adjusting screws 72 are brought into contact with the bottom surfaces of side plate portions 642 of filter support guide frame 64.

FIG. 3 shows the valve drive mechanism 80 for driving valve 33. A cam 81 for driving valve 33 is attached to output shaft 611 of motor 61. A valve driving force transmitting mechanism 82 including a roller 821 is vertically moved by the rotation of cam 81. A lever 83 pivotably supported at its central portion by a pin 831 is rotated (swung) by the vertical motion of valve driving force transmitting mechanism 82. The end portion of lever 83 engages a valve shaft 84 connected to valve 33, and the valve is opened and closed in association with the rotation of the lever and the vertical motion of the valve shaft.

With regard to FIG. 2, filter 35 is sent onto filter support 34 by a filter feeding mechanism 90. The filter 35 unwinds from a filter package 91 and is sent at an appropriate interval onto filter support 34 through rollers 921 and 922 by being drawn by a roller 94 driven by a motor 95. The filter 35 which has been used for the extraction of the liquid mixture is delivered into a scrap container 93 (FIG. 1).

As shown in FIG. 1, an air pump 100 generates pressurized air, and the pressurized air generated is supplied into cylinder 32 through an air pipe 101 connected to valve shaft 84 (FIG. 2) and through the hollow portion of the valve shaft.

In the above-described apparatus, and with regards to FIGS. 2 and 3, the pressing force of filter support 34 onto the bottom of cylinder 32 is adjusted as follows.

Cam 62 is rotated by driving motor 61. Driving force transmitting mechanism 63 is moved down by the rotation of cam 62, and lever 66 is rotated clockwise around the fulcrum of pin 672 as shown in FIG. 3. Pin 671 is moved up along slots 644 by the rotation of lever 66, and at the same time, lifting frame 65 connected to the pin is also moved up. Filter support 34 is moved up together with lifting frame 65 against the downward force of springs 343. The filter support 34 is pressed onto the bottom of cylinder 32 via filter 35 and the filter closes bottom opening 322 of the cylinder.

If the pressing force of filter support 34 is determined to be too weak when the filter support is pressed onto the bottom of cylinder 32, screws 647 are loosened, thereby making filter support guide frame 64 free to move vertically. Thereafter, adjusting screws 72 are rotated and moved up against the force of springs 343. Filter support guide frame 64 is moved up by the lifting force of adjusting screws 72, and pin 672 attached to the filter support guide frame is moved up together with the filter support guide frame. Lever 66 connected to pin 672 is rotated (swung) clockwise around the fulcrum of pin 673 engaged with driving force transmitting mechanism 63 as shown in FIG. 3 (from the continuous line toward the dashed line). Lifting frame 65 engaged with pin 671 is moved up, filter support 34 is also moved up, and the pressing force of the filter support is increased.

If the pressing force of filter support 34 is determined to be too strong, adjusting screws 72 are rotated in the direction reverse to the above lifting operation and filter support guide frame 64 is moved down by its weight and the downward force of springs 343. Lever 66 is rotated counterclockwise around the fulcrum of pin 673 as shown in FIG. 3. Lifting frame 65 and filter support 34 are moved down, and the pressing force of the filter support is decreased.

The pressing force of filter support 34 is adjusted by the vertical adjusting motion of adjusting screws 72 in the above manner, and the pressing force can be easily adjusted to an optimum force (a target force). After this adjustment, screws 647 are fastened and filter support guide frame 64 is fixed in its vertical position.

Thus, the operation of the adjustment of the pressing force to a target force is very easy. Moreover, since the pressing force of filter support 34 can be adjusted merely by the adjustment of the vertical position of filter support guide frame 64, it is not necessary for the parts of the filter support driving mechanism to be precisely made. Therefore, the parts can be easily designed and processed, and the cost of manufacturing the apparatus can be reduced.

Next, the beverage extracting process in this embodiment will be explained with regards to FIGS. 1-3.

Motor 61 is driven and cams 62 and 81 are rotated. Filter support 34 closes the bottom opening 322 of cylinder 32 via filter 35 by the rotation of cam 62 as aforementioned. Valve driving force transmitting mechanism 82 is moved up by the rotation of cam 81, lever 83 is rotated counterclockwise as shown FIG. 3, and valve 33 is moved down via valve shaft 84 to open inflow port 321 of cylinder 32.

A predetermined volume of hot water is introduced into mixing hopper 31 and a predetermined volume of powder is deposited into the mixing hopper. The liquid mixture of hot water and powder is introduced from mixing hopper 31 into cylinder 32 through the opened inflow port 321 and the liquid mixture is stored in the cylinder.

Thereafter, motor 61 is driven again to move valve 33 up and close inflow port 321 of cylinder 32. At this state, the pressurized air is supplied into cylinder 32 from air pump 100 through air pipe 101 and valve shaft 84. The liquid mixture in cylinder 32 is forcibly filtrated via filter 35 by the pressure of the supplied pressurized air and extracted to mixing bin 40 through the inside space of filter support 34 and extracted liquid delivering pipe 41. Thereafter, the sugar and the cream are added to the liquid mixture in mixing bin 40 from sugar bin 42 and cream bin 43 as required, respectively, and a completed liquid with sugar and/or cream or without sugar and cream is poured into cup 50 as a beverage to be sold.

Although the liquid mixture is made from hot water and raw powder (for example, coffee powder) in the above embodiment, a liquid mixture may be made from water having any temperature (for example, cold water) and raw material having any formation.

Figure 6:
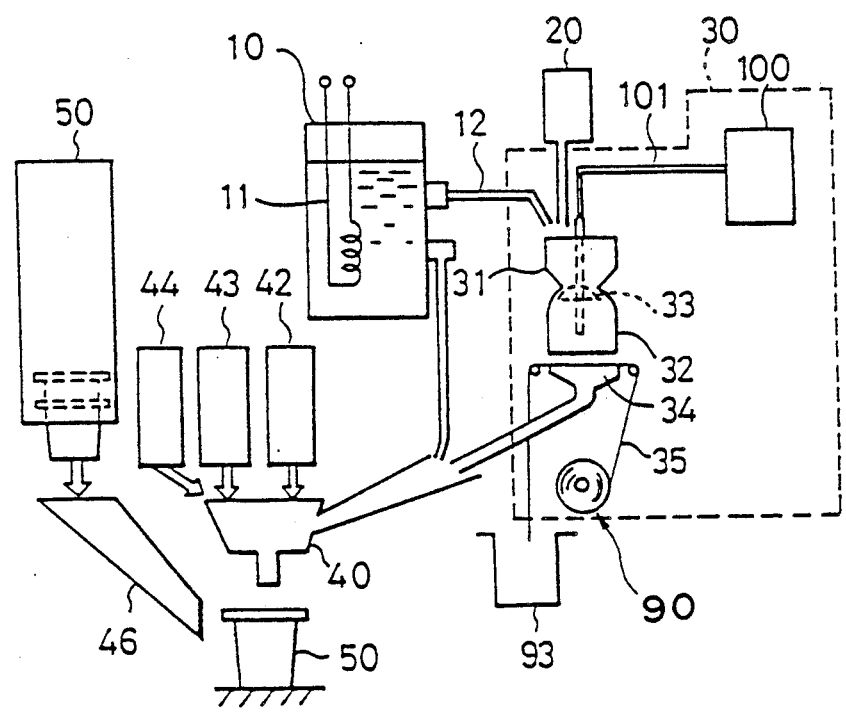
FIG. 6 is a schematic view of a vending machine including a beverage extracting apparatus according to a second embodiment of the present invention.

FIGS. 6 to 10 illustrate a beverage extracting apparatus for vending machines according to a second embodiment of the present invention. FIG. 6 shows a schematic structure of a vending machine, which has substantially the same structure as that shown in FIG. 1 except for the placement of mixing hopper 31 just above cylinder 32.

FIGS. 7 to 10 show beverage extracting apparatus 30 in detail.

Figure 8:
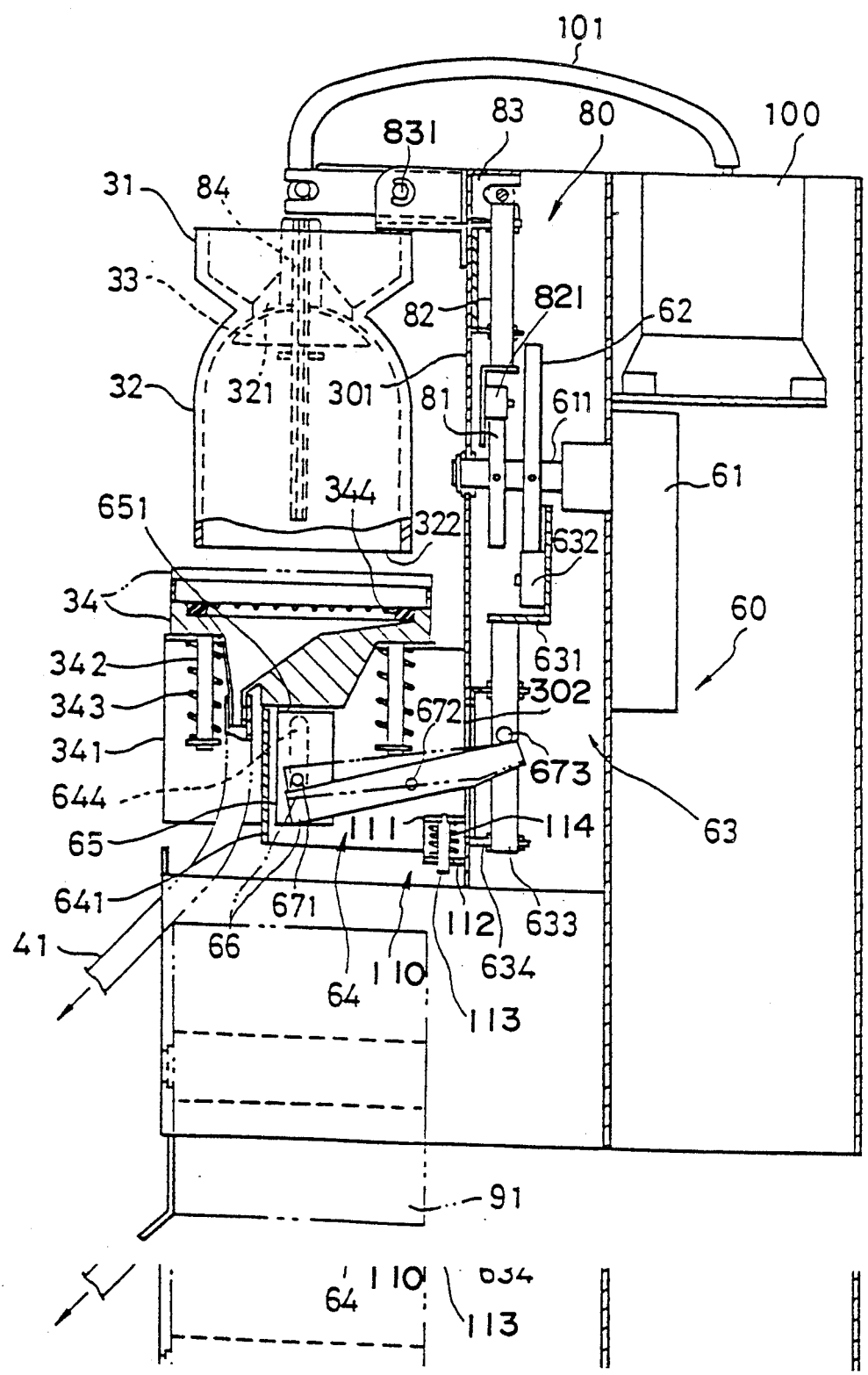
FIG. 8 is a vertical sectional view of the beverage extracting apparatus shown in FIG. 7.
Figure 9:
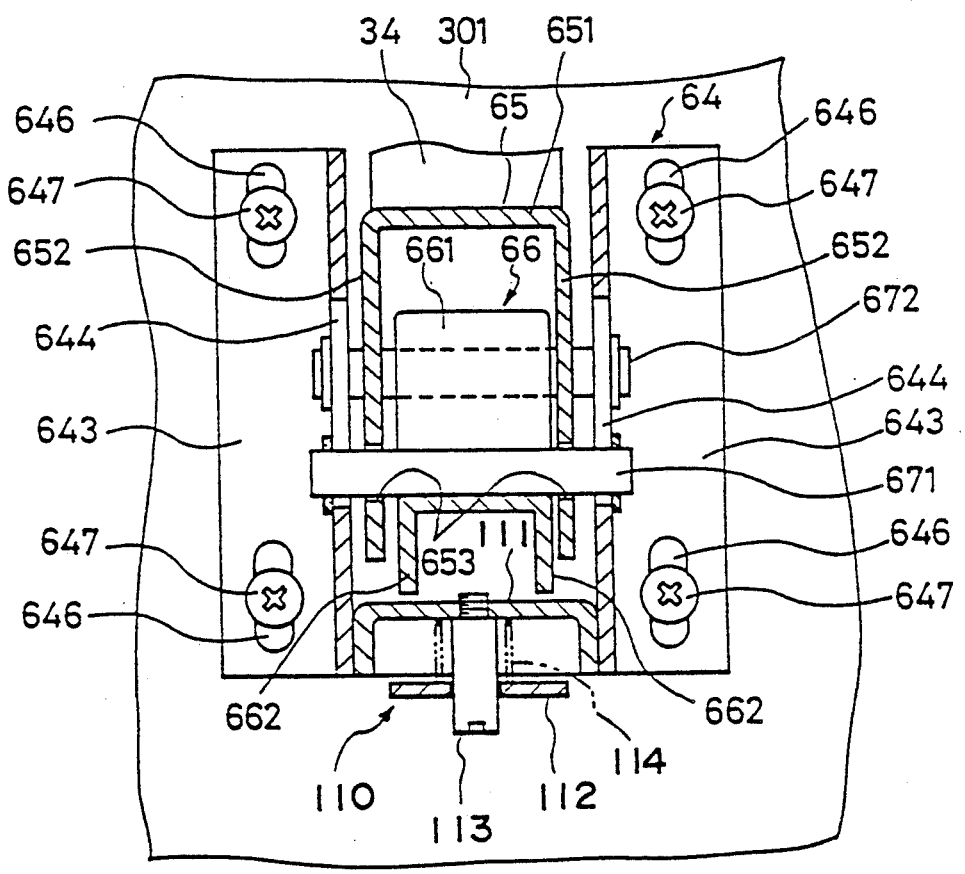
FIG. 9 is an enlarged vertical sectional view of a part of the beverage extracting apparatus shown in FIG. 8.
Figure 10:
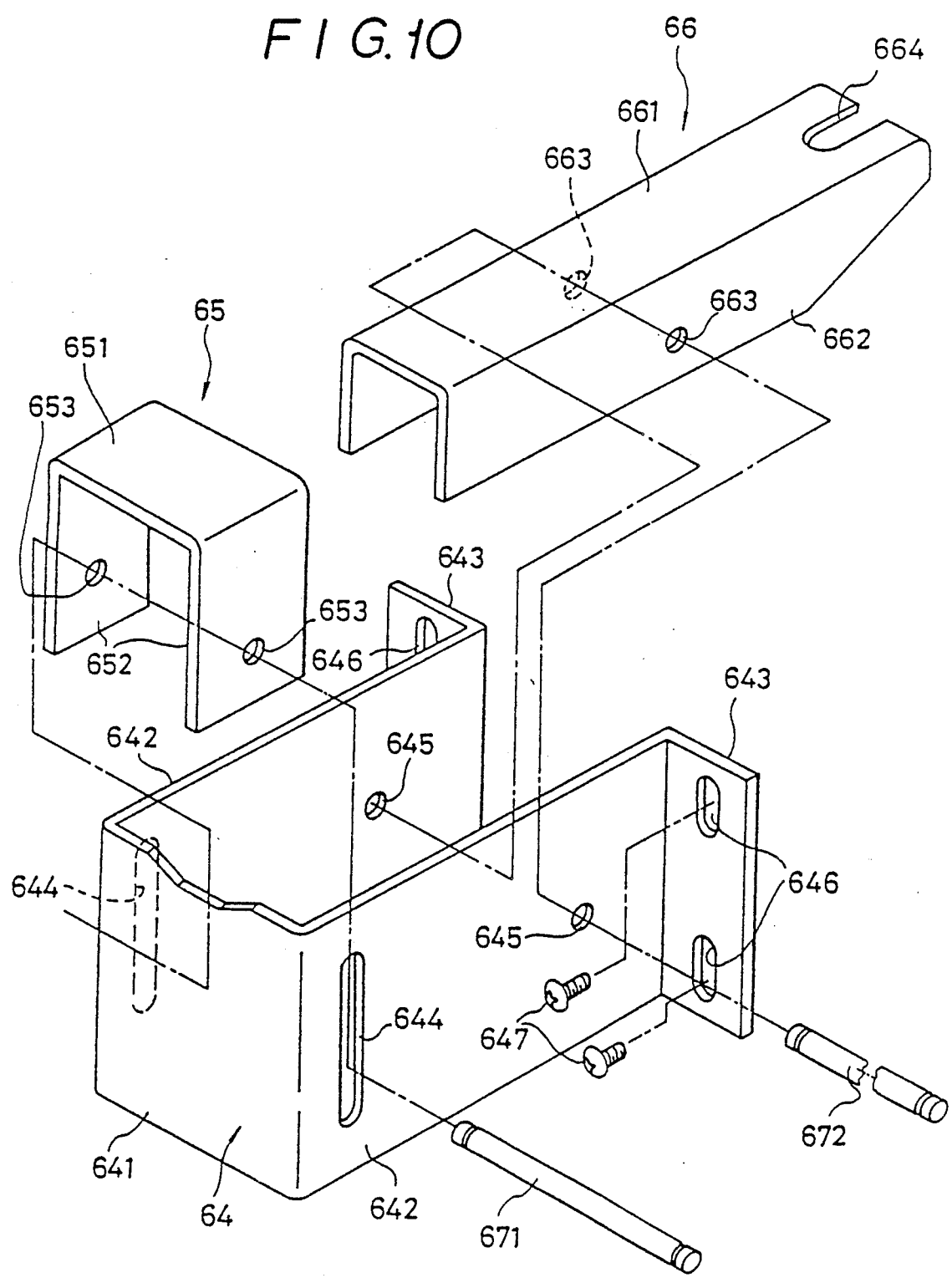
FIG. 10 is an exploded perspective view of the part shown in FIG. 9.
Figure 12:
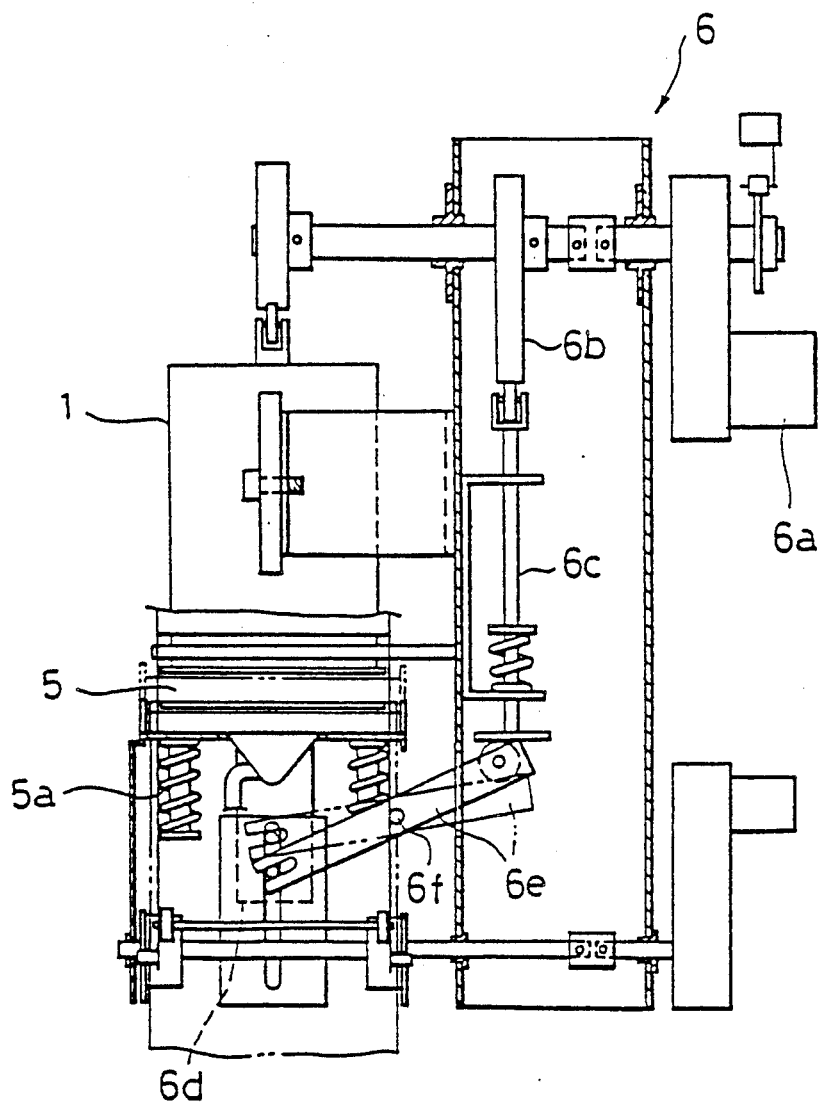
FIG. 12 is an enlarged side view of a part of the prior art apparatus shown in FIG. 11.

With regard to FIGS. 8 to 10, pin 673 fixed to rod 633 is brought into contact with the upper surface of one end portion of lever 66. The rod 633 extends through U-shaped slot 664 defined on one end portion of upper plate 661 of lever 66. Pin 671 fixed to lifting frame 65 is brought into contact with the upper surface of the other end portion of lever 66.

Figure 7:
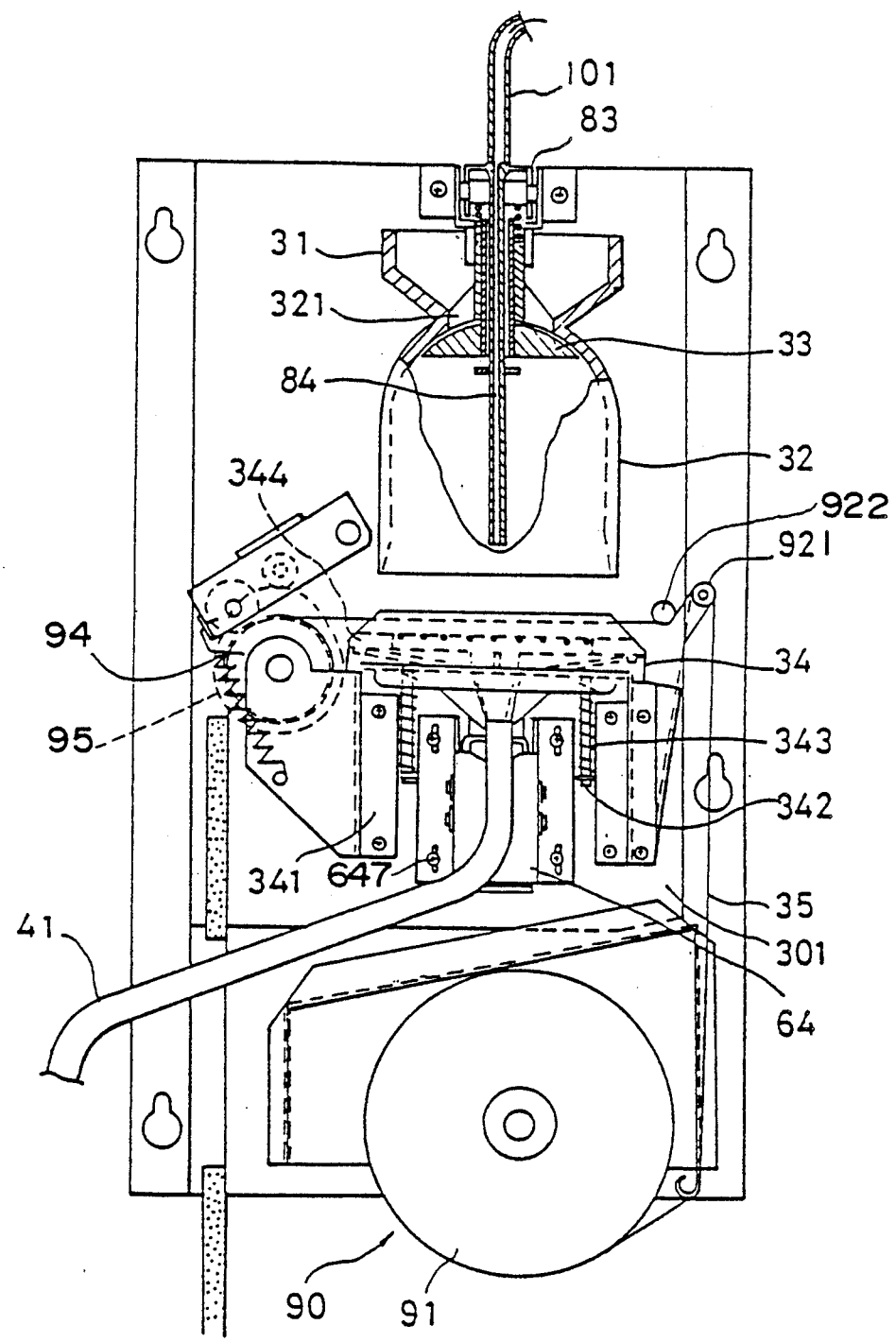
FIG. 7 is an enlarged elevational view of the beverage extracting apparatus shown in FIG. 6.

As shown in FIGS. 7 and 8, resilient packing 344 is provided on filter support 34 and interposed between the upper surface of the filter support and filter 35. Packing 344 presses filter 35 onto the bottom of cylinder 32 by its resiliency when filter support 34 is lifted up. FIG. 9 shows an adjusting means 110 for adjusting the vertical position of filter support guide frame 64. Adjusting means 110 comprises upper bracket 111 fixed to the filter support guide frame, lower bracket 112 fixed to partition 301 and spring 114 disposed between upper and lower brackets 111 and 112 and around guide rod 113 extending through the brackets. Spring 114 urges upper bracket 111 fixed to filter support guide frame 64 upwardly relative to lower bracket 112 fixed to partition 301 provided as a nonmovable portion. Namely, spring 114 urges filter support guide frame 64 upwardly against the downward urging force of return spring 343.

The force of filter support 34 pressing onto the bottom of cylinder 32 is adjusted as follows. If the force of filter support 34 pressing onto the bottom of cylinder 32 is too weak, screws 647 are loosened, thereby making filter support guide frame 64 free to move vertically. The urging force of spring 114 presses against filter support guide frame 64 via upper bracket 111, and the filter support guide frame is moved up by the force of spring 114. Pin 672 attached to filter support guide frame 64 is moved up together with the filter support guide frame. Lever 66 connected to pin 672 is rotated (swung) clockwise around the fulcrum of pin 673 engaged with driving force transmitting mechanism 63 as shown in FIG. 8 (from the continuous line toward the dashed line). Lifting frame 65 engaged with pin 671 and filter support 34 are both moved up, and the force of filter support 34 pressing onto the bottom of cylinder 32 is increased.

If the force of filter support 34 pressing onto the bottom of cylinder 32 is too strong, packing 344 is greatly compressed and generates a reaction force caused by its resiliency. This reaction force moves filter support guide frame 64 down via filter support 34, lifting frame 65, pin 671, lever 66 and pin 672 against the upward urging force of spring 114 of adjusting means 110. Lever 66 is rotated counterclockwise around the fulcrum of pin 673 as shown in FIG. 8. Lifting frame 65 and filter support 34 are moved down, and the pressing force of the filter support is decreased.

Thus, the pressing force of filter support 34 is adjusted via the vertical motion of filter support guide frame 64 caused substantially by the balance of the upward urging force of spring 114 and the downward reaction force of packing 344, and the pressing force can be easily adjusted to an optimum force (a target force). After this adjustment, screws 647 are fastened and filter support guide frame 64 is fixed in its vertical position.

Although several preferred embodiments of the present invention have been described herein in detail, it will be appreciated by those skilled in the art that various modifications and alterations can be made to these embodiments without materially departing from the novel teachings and advantages of this invention. Accordingly, it is to be understood that all such modifications and alterations are included within the scope of this invention as defined by the following claims.

What is claimed is:

1. A beverage extracting apparatus for vending machines comprising:
   a cylinder having an inflow port on its upper portion and an opening on its bottom portion, into which a liquid mixture of water and a raw material of a beverage is introduced through the inflow port;
   valve means for opening and closing said inflow port of said cylinder;
   filter means for covering said bottom opening of said cylinder;
   filter support means for supporting said filter means from the lower side of said filter means, the filter support means opening and closing said bottom opening of said cylinder by vertically moving said filter means;
   pressurization means for supplying pressurized air into said cylinder through an air path when said inflow port is closed by said valve means and said bottom opening is closed by said filter means to forcibly filtrate the liquid mixture stored in said cylinder through said filter means;
   a filter support guide frame to vertically guide said filter support means, the filter support guide frame being adjustable in its vertical position;
   filter support drive means for vertically moving said filter support means, the filter support drive means including a power source, a driving force transmitting mechanism, and a lever, said driving force transmitting mechanism moved vertically by said power source to vertically move said filter support means through said lever the longitudinally central portion of which is vertically pivotably supported by said filter support guide frame, the one end portion of which engages said driving force transmitting mechanism and the other end portion of which engages said filter support means; and
   adjusting means engaging said filter support guide frame for adjusting the vertical position of said filter support guide frame.

2. The apparatus according to claim 1 wherein said filter support means is urged downward by a spring.

3. The apparatus according to claim 1 wherein said power source is a motor and said filter support drive means further includes a cam rotated by said motor to vertically drive said driving force transmitting mechanism.

4. The apparatus according to claim 1 wherein said filter support guide frame is disposed below said filter support means and is fixable at a position vertically adjusted by said adjusting means.

5. The apparatus according to claim 1 wherein said central portion of said lever is pivotably supported by said filter support guide frame via a pin connected to the filter support guide frame.

6. The apparatus according to claim 1 wherein said lever further comprises a slot defined on said one end portion thereof, said slot engaging said driving force transmitting mechanism through a pin connected to the driving force transmitting mechanism.

7. The apparatus according to claim 1 wherein said other end portion of said lever engages said filter support means via a slot defined on the other end portion and a pin connected to the filter support means.

8. The apparatus according to claim 1 wherein said filter support means comprises a first member directly supporting said filter means and a second member connected to said first member and engaging said lever.

9. The apparatus according to claim 1 wherein said adjusting means is disposed below said filter support guide frame.

10. The apparatus according to claim 1 wherein said adjusting means includes an adjusting screw which engages said filter support guide frame.

11. The apparatus according to claim 1 wherein said valve means further comprises a valve shaft extending through the valve means and having a hollow portion opening into said cylinder, the hollow portion of the valve shaft constituting a part of said air path.

12. The apparatus according to claim 1 wherein the water is hot water.

13. The apparatus according to claim 1 wherein the raw material is a powder.

14. A beverage extracting apparatus for vending machines comprising:
   a cylinder having an inflow port on its upper portion and a bottom opening, into which a liquid mixture of water and a raw material of a beverage is introduced through the inflow port;
   valve means for opening and closing said inflow port of said cylinder;
   filter means for covering said bottom opening of said cylinder;
   filter support means for supporting said filter means from the lower side of said filter means via packing means having a resilient property, the filter support means opening and closing said bottom opening of said cylinder by vertically moving said filter means;
   pressurization means for supplying pressurized air into said cylinder through an air path when said inflow port is closed by said valve means and said bottom opening is closed by said filter means to forcibly filtrate the liquid mixture stored in said cylinder through said filter means;
   a filter support guide frame to vertically guide said filter support means, the filter support guide frame being adjustable in its vertical position;
   filter support drive means for vertically moving said filter support means, the filter support drive means including a power source, a driving force transmitting mechanism and a lever, said driving force transmitting mechanism moved vertically by said power source to vertically move said filter support means through said lever the longitudinally central portion of which is vertically pivotably supported by said filter support guide frame, the one end portion of which engages said driving force transmitting mechanism and the other end portion of which engages said filter support means; and adjusting means engaging said filter support guide frame for adjusting the vertical position of said filter support guide frame, said adjusting means having spring means for urging said filter support guide frame upward.

15. The apparatus according to claim 14 wherein said filter support means is urged downward by a spring.

16. The apparatus according to claim 14 wherein said power source is a motor and said filter support drive means further includes a cam rotated by said motor to vertically drive said driving force transmitting mechanism.

17. The apparatus according to claim 14 wherein said filter support guide frame is disposed below said filter support means and is fixable at a position vertically adjusted by said adjusting means.

18. The apparatus according to claim 14 wherein said central portion of said lever is pivotably supported by said filter support guide frame via a pin connected to the filter support guide frame.

19. The apparatus according to claim 14 wherein said lever engages said driving force transmitting mechanism via a pin connected to the driving force transmitting mechanism and brought into contact with the upper surface of said one end portion of the lever.

20. The apparatus according to claim 14 wherein said other end portion of said lever engages said filter support means via a pin connected to the filter support means and brought into contact with the upper surface of the other end portion of the lever.

21. The apparatus according to claim 14 wherein said filter support means comprises a first member directly supporting said filter means via said packing means and a second member connected to said first member and engaging said lever.

22. The apparatus according to claim 14 wherein said adjusting means is disposed below said filter support guide frame.

23. The apparatus according to claim 14 wherein said adjusting means includes an upper bracket fixed to said filter support guide frame, a lower bracket fixed to a nonmovable portion and a spring interposed between said upper and lower brackets.

24. The apparatus according to claim 14 wherein said valve means further comprises a valve shaft extending through the valve means and having a hollow portion opening into said cylinder, the hollow portion of the valve shaft constituting a part of said air path.

25. The apparatus according to claim 14 wherein the water is hot water.

26. The apparatus according to claim 14 wherein the raw material is a powder.

* * * * *